United States Patent [19]

Schmidt

[11] Patent Number: 4,690,434

[45] Date of Patent: Sep. 1, 1987

[54] PIPE COUPLING

[76] Inventor: Victor P. Schmidt, 12304 N. Ledges, Roscoe, Ill. 61073

[21] Appl. No.: 227,938

[22] Filed: Jan. 23, 1981

[51] Int. Cl.⁴ ............................................. F16L 21/02
[52] U.S. Cl. ........................................ 285/31; 285/12; 285/93; 285/296; 285/423; 285/915
[58] Field of Search ................. 285/31, DIG. 16, 915, 285/423, 110, 12, 177, 291, 292, 296, 169

[56] References Cited

U.S. PATENT DOCUMENTS

| 2,219,289 | 10/1940 | Bennett | 285/291 X |
| 3,152,820 | 10/1964 | Giampa et al. | 285/DIG. 16 |
| 3,471,574 | 7/1976 | Curtin | 285/31 |
| 3,857,588 | 12/1974 | Curtin | 285/31 |
| 4,013,309 | 3/1977 | Quick | 285/31 |
| 4,023,831 | 5/1977 | Thompson | 285/31 |
| 4,035,002 | 7/1977 | Curtin | 285/31 |
| 4,072,328 | 2/1978 | Elliott | 285/169 |

FOREIGN PATENT DOCUMENTS

| 556079 | 4/1957 | France | 285/177 |
| 1391469 | 1/1965 | France | 285/110 |
| 2309780 | 11/1976 | France | 285/31 |
| 1035543 | 7/1966 | United Kingdom | 285/177 |

Primary Examiner—Davie W. Arola

[57] ABSTRACT

A coupling for joining the open ends of unthreaded pipe sections is disclosed which includes a first coupling member adapted to be fitted over and adhered to the open end of one of the pipe sections and a second coupling member having a portion thereof fitted over and adhered to the open end of the other pipe section and a portion thereof adapted to be fitted on and adhered to the first coupling member. The first coupling member is designed so that the end thereof can be brought into abutting relationship with the open end of the pipe section containing the other coupling member while maintaining the longitudinal axis of both of the pipe sections parallel to each other at all times.

7 Claims, 10 Drawing Figures

FIG. 5
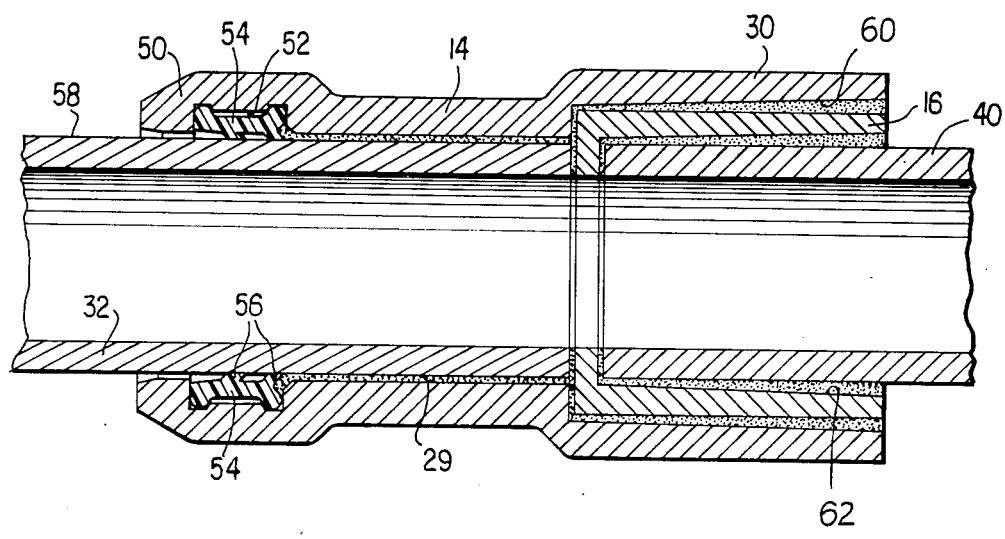
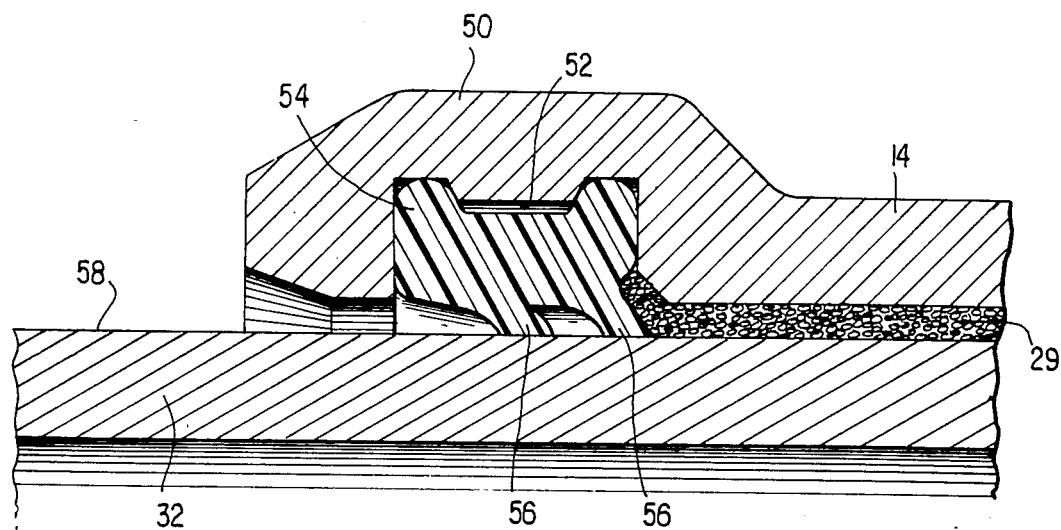
FIG. 6

PIPE COUPLING

BACKGROUND OF THE INVENTION

This invention relates to pipe couplings and more specifically to a novel and useful pipe coupling which is particularly suited for joining unthreaded pipe sections of the PVC type.

It is a primary object of the invention to provide a pipe coupling which, as a result of its unique design, is capable of joining the open ends of heavy gauge PVC pipe sections while maintaining the longitudinal axis of both sections parallel to each other at all times. This feature is particularly useful when the open ends of the pipe sections to be joined are spaced apart and fixed on a common longitudinal axis such as when they extend between walls of a building or are buried in the ground and it is desired to connect the ends by means of an intermediate section. Further when the pipe sections are of the thick walled, PVC (polyvinyl chloride) type they are substantially incapable of being bent particularly when the location of the point where they are fixed is proximate the end thereof to be joined. In addition applicant's coupling is designed so that when the coupling has been correctly installed, i.e. the pipe ends being joined are at the midpoint of the coupling, the relative position of the coupling elements with respect to each other give a visual indication that the pipe ends are at the midpoint of the coupling.

The prior art structure in this area of which applicant is aware is exemplified, for example, in U.S. Pat. No. 3,857,588 which discloses a coupling for pipes of the PVC type which consists of two or more elements which are bonded by solvent cement to the pipe sections and to each other. However, it is necessary to bend at least one of the pipe sections before the coupling can be installed which presents little problem when the pipe is of small diameter and of relatively thin wall construction. However, when the pipe sections to be joined are of large diameter, thick wall construction and are fixed relative to each other, they cannot for all practical purposes be bent sufficiently to install the aforementioned pipe couplings of the prior art.

In addition numerous other pipe couplings for PVC type pipe have uninterrupted internal surfaces which make it difficult to determine exactly at what point in the coupling the pipe ends are joined.

It is therefore a further primary object of the present invention to provide a superior coupling for pipes of the unthreaded PVC type.

It is another object of the present invention to provide a coupling which, due to its unique construction is particularly suitable for joining open ended, rigidly fixed, thick wall spaced apart sections by means of an intermediate section of pipe without any degree of bending either pipe section.

It is yet another object of the present invention to provide a coupling which, due to its unique construction, permits a visual indication that the coupling has been correctly installed as required by the plumbing codes in numerous jurisdictions.

It is a further object of the present invention to provide a pipe coupling of the type described which is easily and quickly installed due to its tapered inner surfaces, which is inexpensive to manufacture, and which in one embodiment thereof has an additional sealing means.

These and other objects of the invention will become apparent during the course of the following description and appended claims, taken in connection with the accompanying drawing forming a part hereof.

BRIEF DESCRIPTION OF THE DRAWINGS

FIG. 5 is a cross-section view of another embodiment of the coupling of the present invention; and FIG. 6 is an enlarged view of a portion of the embodiment of FIG. 5.

DETAILED DESCRIPTION OF THE INVENTION

Figure 1:
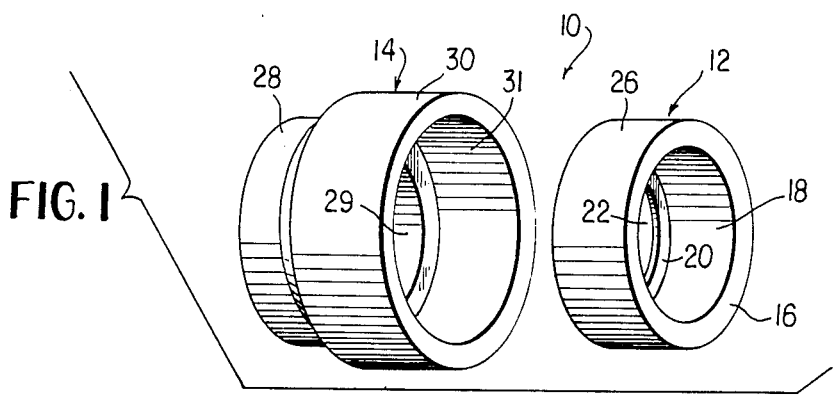
FIG. 1 is a perspective view of the coupling constructed in accordance with the principles of the invention.

Referring now to the drawings where like characters of reference refer to similar elements in each of the several figures, numeral 10 indicates the pipe coupling of the present invention made in its preferred form of PVC type material for joining unthreaded, open ended pipe sections also made of material of the PVC type.

Figure 2:
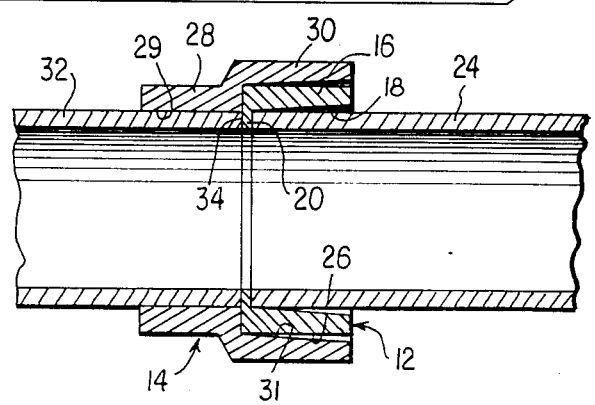
FIG. 2 is a cross-section view of the pipe coupling joining two sections of pipe.

The coupling 10 consists of a first coupling member 12 and a second coupling member 14 as can best be seen by referring to FIGS. 1 and 2. The first coupling member 12 has a tubular shaped portion 16 with an inner surface 18 which is slightly tapered and terminates at a radially, inwardly extending flange 20. The inner surface 18 is frusto-conically shaped to a slight extent. The flange 20 is integrally formed on one end of the tubular portion 16 and terminates to form a circular recess 22 the diameter of which is substantially the same as the internal diameter of the pipe section 24 on which the coupling 10 is used. The tubular portion 16 and flange 20 are substantially L-shaped in cross-section. The tubular shaped portion 16 has an external cylindrical shaped surface 26 over which a portion of the second coupling member 14 extends and an inner diameter which is slightly larger than the outer diameter of the pipe section 24 on which it is used.

The second coupling member 14 is also tubular in shape and has a first tubular shaped portion 28 with an inner cylindrical shaped surface 29 and a second tubular shaped portion 30 with an inner surface 31 which is also slightly tapered. The inner surface 31 is frusto-conically shaped to a slight extent also. The inner diameter of the first tubular portion 28 is slightly larger than the external diameter of the other pipe section 32 to permit its easy positioning thereon and the inner diameter of the second tubular section 30 is tapered and slightly larger than the outer diameter of the tubular shaped portion 16 again to facilitate its easy positioning thereover and cementing thereto. The lengths of the inner cylindrical surface 31 of tubular shaped portion 30 is approximately the same as the length of external surface 26 of tubular portion 16. As should be noted, the outer surface 34 of the flange 20 extends in a plane from the external surface 26 to the circular recess 22 and is flat, the precise advantage of which will now be discussed with reference to FIGS. 3(a)–(c).

Figure 3A:
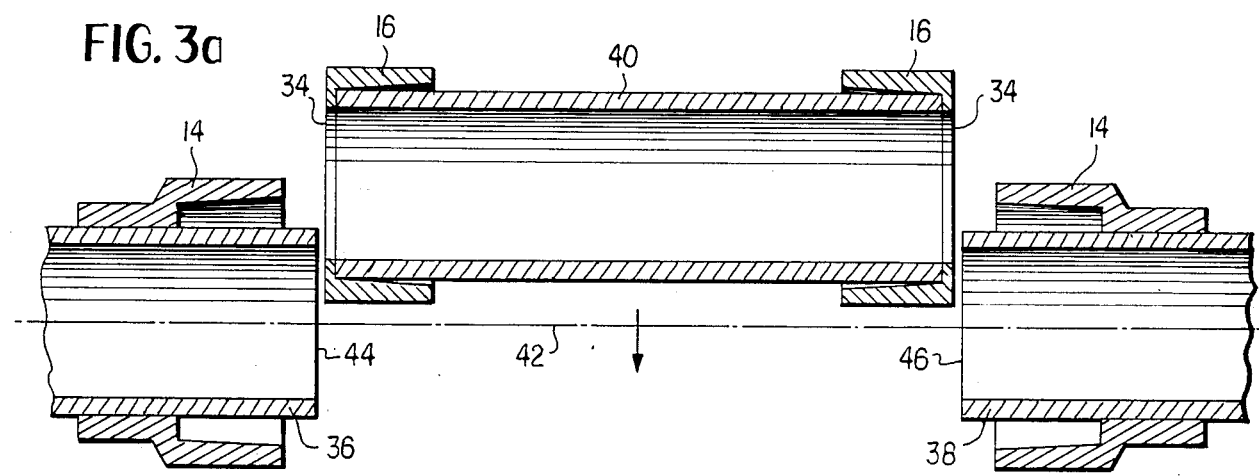
FIGS. 3(a)-(c) show the sequence in cross section of the use of coupling elements to joint the ends of rigidly held pipe sections by means of an intermediate pipe section.

FIG. 3(a) shows the typical use of the pipe coupling 10 of the present invention to joing the open ends of pipe sections 36, 38 by means of an intermediate pipe section 40. The pipe sections 36 and 38 are on the same longitudinal axis 42 and are fixed adjacent their ends so that neither is capable of being bent so that the longitudinal axis 42 is uncommon to both. This situation where both sections of pipe 36, 38 are fixed relative to each other is very common and most often experienced in underground pipe repair work or where the pipe sections extend through the walls or floors of buildings or the like. If the diameter of the pipe section 36, 38 is large or the wall thickness is great, or both, it is impossible to bend the pipe sections sufficiently to install the above mentioned piped couplings of the prior art particularly when they are fixed relatively close to the open end thereof to be joined. If first coupling members 12 are positioned on the intermediate member 40, as shown in FIG. 3(a), the overall length of the intermediate member 40 plus the width of the flanges 20 associated therewith, i.e. the distance between the flat surfaces 34 of the installed first coupling members 12 should be slightly less than the distance between the ends 44, 46 of the pipe sections 36, 38 respectively to be joined. Second coupling members 14 will then be positioned on the ends 44, 46 of the pipe sections 36, 38 to mate with first coupling members 12.

Figure 3B:
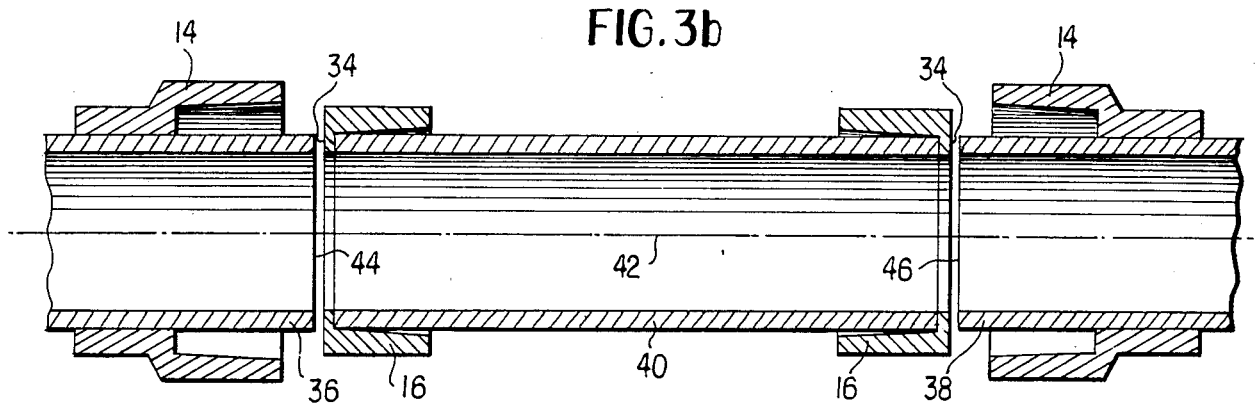
Figure 3C:
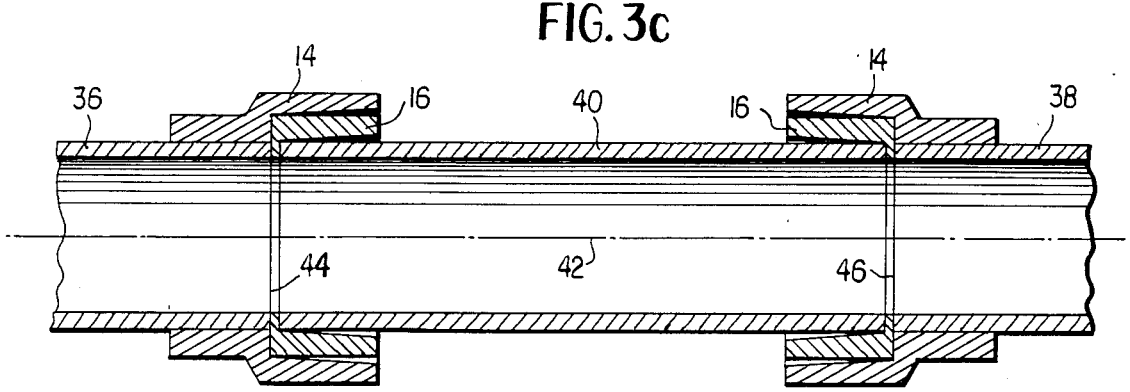
Figure 4A:
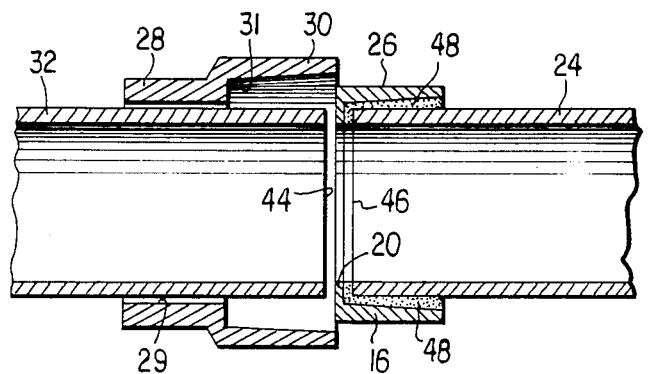
FIGS. 4(a)-(c) show in cross section the sequence for applying the solvent cement to insure complete sealing of the joint.
Figure 4B:
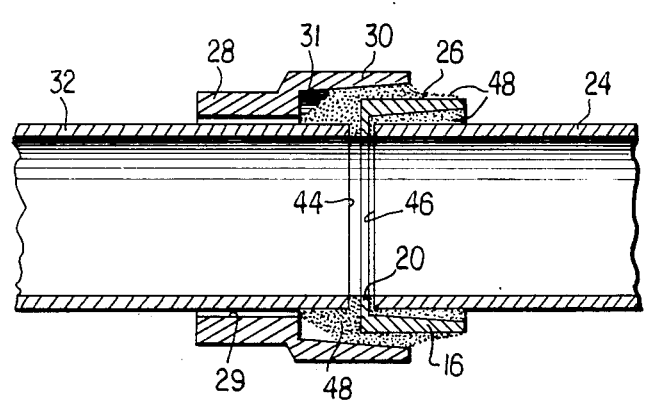
Figure 4C:
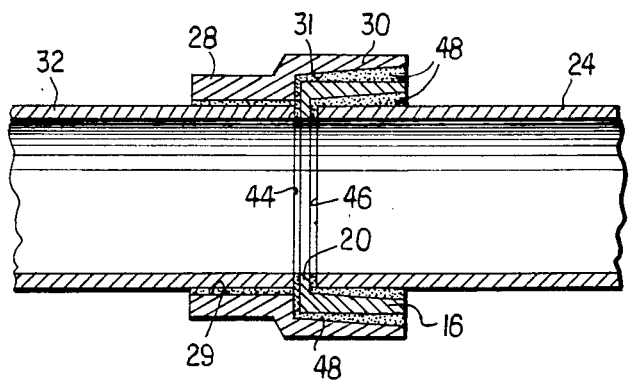

As can be seen in FIG. 3(b), the intermediate pipe section 40 and associated first coupling members 12 are positioned between the ends 44, 46 by holding same parallel to the axis 42 and moving it transverse thereto to a position between the ends 44, 46. Once in position, the second coupling members 14 are moved to a position shown in FIG. 3(c) wherein the second tubular shaped portion 30 of each thereof covers the external surface 26 of tubular portion 16 completing the connection. The relative locations of the first and second coupling members 12, 14 with respect to the intermediate section 40 and pipe section ends 44, 46 can be any that is convenient. The procedure for applying the conventional solvent cement used in PVC applications is shown in FIGS. 4(a)–(c). First, solvent cement 48 is placed around the end 46 of the pipe section 24 and the tubular shaped portion 16 of first coupling member 12 is slid thereon until the flange 20 stops further movement. The pipe section 32 is then positioned adjacent the flange 20 and solvent cement 48 is placed around the end 44, the flange 20 and the outer surface 26. The second coupling member 14 is then slid over the outer surface 26 until the second tubular portion 30 and the second coupling member 14 are coextensive. By following this cementing procedure, no appreciable amount of solvent cement is left on an exposed surface of pipes or coupling members. Further, because the aforementioned lengths of surfaces 26 and 31 are substantially the same, it is an accurate, visual indication that the coupling has been correctly installed, i.e. the ends 44, 46 of the pipes to be joined both abutt the flange 20 when the surfaces 26, 31 are coextensive. It is to be understood, of course, that the pipe coupling 10 of the present invention can be modified to join pipes of different diameters.

Referring now to the embodiment of FIGS. 5 and 6, the second coupling member 14 is formed with a portion 50 having a radially outwardly extending recess 52 on its inner surface 29. A circular seal 54 is positioned in the recess 52 and it has a plurality of inward radially extending fingers 56 which sealingly engage the outer surface 58 of the pipe section 32. The fingers 46 perform the dual function of serving as a scoop to push the solvent cement 48 forward into the joint to insure its complete filling as well as serving as a seal to further insure water tight integrity across the coupling when the pressure of the fluid being handled is high. Similarly, the inner surface 60 of tubular shaped portion 30 is slightly tapered to form a frusto-conical shape as is inner surface 62 of tubular portion 16.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A coupling for joining the open ends of first and second pipe sections, said coupling comprising:
   (a) a first coupling member having an elongated portion with an outer surface of a predetermined length and an inner diameter larger than the outer diameter of said first pipe section, a flange element extending radially inward and terminating at a circular recess, said flange element having an inner surface for limiting sliding of said first coupling element on the end of said first pipe, said flange element having an outer surface which extends in a plane from said outer surface of said first coupling member to said circular recess,
   (b) a second coupling member having a first portion with an inner diameter larger than the outer diameter of said second pipe, a second portion having a recess of a predetermined length and of a diameter larger than the outer diameter of said first coupling member for sliding thereover and a surface extending radially from said inner diameter of said first elongated portion to the inner diameter of said second elongated portion for engaging said outer surface of said flange element to limit sliding movement of said second coupling member on said first coupling member, and
   (c) means for securing said first and second coupling members together and to said first and second pipe sections respectively, said length of said outer surface of said first coupling member and said length of said inner recess of said second portion of said second coupling member being substantially the same to provide a visual indication when said first coupling member is fully inserted into said seconed coupling member.

2. A coupling as set forth in claim 1 wherein said elongated portion and said flange element form a wall which is substantially L-shaped in cross-section.

3. A coupling as set forth in claim 1 wherein said first and second coupling members are made of a plastic-like material.

4. A coupling as set forth in claim 1 wherein said first portion of said second coupling member has an outwardly radially extending recess adjacent one end thereof and seal means positioned in said recess engaging said second pipe for insuring a fluidtight seal therebetween.

5. A coupling as set forth in claim 5 wherein said seal means has at least one inward, radially extending finger for engaging said second pipe to provide said seal.

6. A coupling as set forth in claim 1 wherein the surface formed by said inner diameter of said elongated portion of said first coupling member and the surface formed by said diameter of said recess of said second portion of said second coupling member are both tapered to facilitate their assembly and cementation to adjacent surfaces.

7. A coupling for joining the open ends of first and second pipe sections, said coupling comprising:
(a) a first coupling member having an elongated portion with an outer surface of a predetermined length and an inner diameter larger than the outer diameter of said first pipe section, a flange element extending radially inward and terminating at a circular recess, said flange element having an inner surface for limiting sliding of said first coupling element on the end of said first pipe, said flange element having an outer surface which extends in a plane from said outer surface of said first coupling member to said circular recess,
(b) a second coupling member having a first portion with an inner diameter larger than the outer diameter of said second pipe, a second portion having a recess of a predetermined length and of a diameter larger than the outer diameter of said first coupling member for sliding thereover and a surface extending radially from said inner diameter of said first elongated portion to the inner diameter of said second elongated portion for limiting sliding movement of said second coupling member on said first coupling member, said length of said outer surface of said first coupling member and said length of said inner recess of said second portion of said second coupling member being substantially the same to provide a visual indication when said first coupling member is fully inserted into said second coupling member, and
(c) means for securing said first and second coupling members together and to said first and second pipe sections respectively.

* * * * *